(12) United States Patent
Hollaar et al.

(10) Patent No.: US 8,794,974 B2
(45) Date of Patent: Aug. 5, 2014

(54) METHOD AND SYSTEM FOR AUTOMATING THE SCORING OF TASK INFORMATION

(75) Inventors: Lee A. Hollaar, Salt Lake City, UT (US); Jodi Morstein Groot, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 13/559,187

(22) Filed: Jul. 26, 2012

(65) Prior Publication Data

US 2012/0301855 A1 Nov. 29, 2012

Related U.S. Application Data

(63) Continuation-in-part of application No. 12/129,003, filed on May 29, 2008, now Pat. No. 8,562,354.

(60) Provisional application No. 60/941,889, filed on Jun. 4, 2007, provisional application No. 61/525,935, filed on Aug. 22, 2011.

(51) Int. Cl.
*G09B 19/00* (2006.01)
*G09B 7/00* (2006.01)
*G09B 3/00* (2006.01)
*G06Q 10/10* (2012.01)
*G06Q 10/06* (2012.01)

(52) U.S. Cl.
CPC ........ *G06Q 10/109* (2013.01); *G06Q 10/06311* (2013.01); *G09B 19/00* (2013.01); *G09B 7/00* (2013.01)
USPC ........... 434/236; 434/238; 434/322; 434/323; 434/350

(58) Field of Classification Search
CPC ............ G09B 5/00; G09B 7/00; G09B 19/00; G06Q 10/109; G06Q 10/06311; G06Q 30/02; G06Q 50/20
USPC .................................. 434/236, 238, 323, 350
See application file for complete search history.

(56) References Cited

U.S. PATENT DOCUMENTS

| | | | | |
|---|---|---|---|---|
| 6,042,383 | A * | 3/2000 | Herron | 434/238 |
| 6,141,529 | A * | 10/2000 | Remschel | 434/350 |
| 6,513,042 | B1 * | 1/2003 | Anderson et al. | 1/1 |
| 2003/0124493 | A1 * | 7/2003 | Kulack | 434/118 |
| 2005/0153267 | A1 * | 7/2005 | Goldman et al. | 434/308 |
| 2005/0233295 | A1 * | 10/2005 | Chiszar et al. | 434/350 |

* cited by examiner

*Primary Examiner* — Xuan Thai
*Assistant Examiner* — Jerry-Daryl Fletcher
(74) *Attorney, Agent, or Firm* — Kory D. Christensen; Stoel Rives LLP (57) ABSTRACT

A method and system for scoring task information. Through the use of an electronic time management device, such as a cell phone or other portable digital computer based device programmed to support this method, a user enters a description of a task and when the task should be completed. This information is then communicated to a scoring system, and the information is scored without human intervention and points are given. Optionally, if the information cannot be automatically scored, it is scored by a person. These points can be banked and then be used toward a socially desirable reward, such as sending text messages or playing music or watching videos. This is particularly effective in teaching time management skills to young students who may have attention deficit hyperactivity disorder (ADHD).

23 Claims, 4 Drawing Sheets

METHOD AND SYSTEM FOR AUTOMATING THE SCORING OF TASK INFORMATION

CROSS-REFERENCE TO RELATED APPLICATIONS

This application is a continuation-in-part of United States Utility patent application Ser. No. 12/129,003, filed May 29, 2008, which claimed benefit of Provisional Patent Application Ser. No. 60/941,889, filed on Jun. 4, 2007. It also claims benefit of Provisional Patent Application Ser. No. 61/525,935, filed Aug. 7, 2011. Those prior applications are hereby incorporated by reference.

BACKGROUND

In parent application Ser. No. 12/129,003, we described a solution to assist with time management, working memory, and executive function for students, especially those with ADHD. Accurately recording descriptions of tasks to be performed (including a description of the work to be performed and the required completion time, which may either be a particular day or a particular time during that day, depending on the assignment), remembering homework and supplies, completing homework, handing in homework, and remembering future appointments, practices, and meetings are challenging tasks for many students and are especially difficult for those with ADHD.

It is a system and method centered around one or more time management devices, which could be a smartphone, pocket PC, media player, hand-held game device, tablet or mini-tablet, or other easily-carried device on which programs adapted to implement the method can be run. Other computer programs, utilized by the teacher, student, or parent/guardian, interact with the program on the student's time management devices.

The student enters task descriptions (such as the homework problems or reading assigned and their required completion time, things to bring to a later class, or events to be attended) into the time management device. Those descriptions are then furnished to the teacher or parent/guardian who confirm that the information was entered correctly. When the task entry has been confirmed, the student receives "banked points" which are stored in the time management device and can be later used by the student toward a socially desirable reward, such as being able to make or receive telephone calls if the time management device is a cell phone, playing music or watching a video if the time management device has a media player function, or playing a game if the time management device acts as a game console.

Entering Task Information

Figure 1:
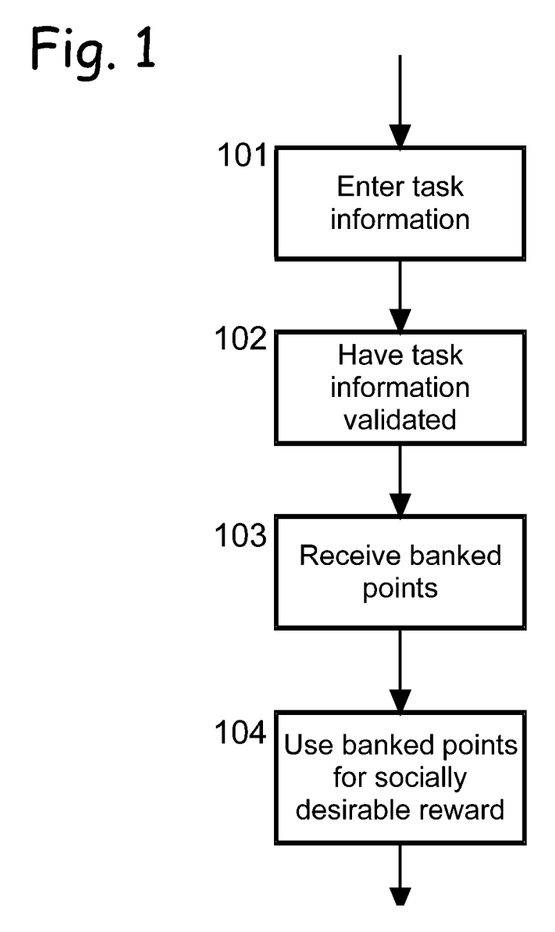
FIG. 1 illustrates the key steps of the method of parent application Ser. No. 12/129,003.

Referring to FIG. 1, in Step 101 the user enters task descriptions or information into the time management device. This will normally be a student entering assignments of homework to be performed on a page for each class period throughout the school day. Space for upcoming quizzes and test dates can also be provided, as students frequently fail to record events that are not in the present or are set for the future. Space will be provided for specific instructions or additional detail not available on the menu provided on the page. When student enters a task descriptions he/she will immediately receive an animated visual reward (such watching a brief anime or cartoon) and a numerical value, which will provide immediate reinforcement at the "point of performance." The menu will offer students space for noting "no assignment," "cancelled classes," or any other reason why an assignment was not made that day in class. If student does not make an entry for each class, the system will prompt student, through a vibration or visual cue.

Students can also be prompted to remember homework and supplies. When a homework assignment description has been entered, at the end of the school day a prompt and vibration will occur which will cue the student to take home applicable text books and materials and will provide a daily "to do list" that reminds the student of his/her assignments and when they are due. The scheduling function on the calendar will record assignments that are due the next day as well as those that extend over time.

While the normal way of entering assignments or other information will be the keyboard or touch screen on the time management device, voice entry of information is also possible, using techniques well-known for smartphones or similar devices.

Validating Task Entries

In Step 102, the user will have the task entries that have been entered validated. In order to assure that task entries are recorded accurately and reinforce positive student efforts at tracking, some embodiments of the system includes a validation program operated by the teacher in conjunction with the time management device. The validation program can either be a stand-alone program used by the teacher or, preferably, a module integrated with the teacher's grade-recording system to reduce the teacher's effort by eliminating duplicate operations.

Figure 2:
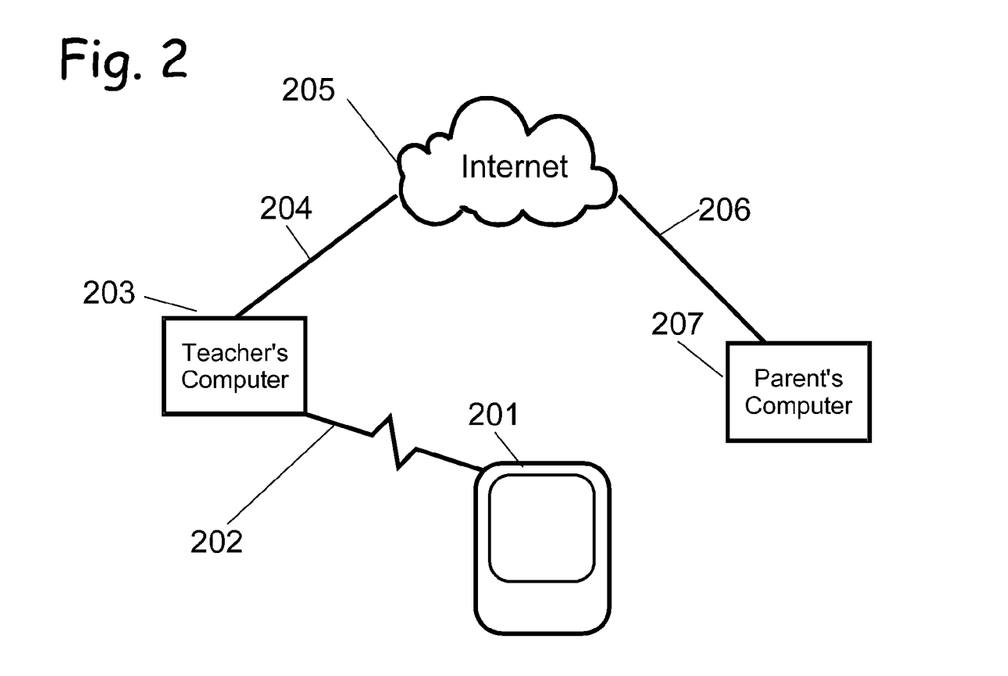
FIG. 2 illustrates a representative configuration for the system of that application.

Referring to FIG. 2, in one embodiment each student's time management device 201 will connect to the validation program running on their teacher's computer 203 by the use of a wired connection, docking station, wireless Internet connection (WiFi), infrared connection, or preferably a Blue Tooth short-range wireless connection 202. Other connection techniques are also possible without departing from the claimed invention. The techniques used to establish and maintain such a connection are well-known to persons with ordinary skills in the art, and will depend on the particular device used to implement the time management device and the teacher's computer running the validation program.

In another embodiment, each student's time management device 201 will connect to an intermediate storage computer and provides task entries to be validated. These can then be reviewed by the teacher and the results of the validation returned, again through the intermediate storage computer.

Students can receive immediate visual and numerical rewards when they enter task entries into their time management system, regardless of whether or not the entry is accurate. An entertaining "reward" may be important to reinforce the desired behavior of immediately entering assignments. Prior to leaving class, each student will transmit the task entries, such as homework assignments, that have been entered to the teachers' computer. If transmission is not completed, the time management device can provide the student a prompt through vibration or visual cue. The task entry as entered by the student can be reflected on the teacher's class information for the appropriate class period.

At a convenient point in the day, the teacher can check the student-entered task entries and validate their accuracy with "yes/save" or "no/correct" responses. The teacher can enter task descriptions correctly if student has missed information. Once the task entry has been corrected, the teacher responses can be stored on server or on teacher's computer, depending on how the teacher's validation program is configured. This could possibly include storing the information in a column added to teacher's electronic grade book.

Optionally, the teacher can provide an estimate for how long the task, such as a homework assignment, should take to complete. This can later be used by the student in scheduling times to work on the task.

Note that this is more than simply checking that the information entered is possible, such as not allowing obviously incorrect entries like tasks that must be completed on February 30th. Instead, it is a comparison of the student-entered task entries with the task as actually assigned by the teacher, with points being awarded based on how close the task entry was to the actual assignment.

Information Entry and Display

The homework assignments and other tasks can be displayed ordered by their completion times. Color can be used to indicate when it is important that an assignment or task be started immediately or soon, so that it can be completed on time.

The student might also arrange the tasks in the order he or she currently contemplates performing them. This display can be further enhanced by superimposing it on a display of scheduled activities, such as school time, so that the student can plan when he or she may work on a particular task. The time management device will use the estimated time to complete the task as provided by the teacher, or can use an estimate provided by the student.

Other displays allow the student to see and edit assignments for particular classes. A display can be selected that shows all the classes the student is taking. When one of those classes is selected, the assignments that have not been completed for that class can be displayed. Other displays are also possible, such as showing the status of assignments that were recently handed in, including the points received for turning the assignment and awarded based on the grade received for the assignment Two other displays might be selected on the top-level display. The first contains an indication of the number of points in the student's "bank" and indicates recent transactions, such as points awarded and points used.

The other display is a summary for the student of assignments that are due and when. The summary can include those assignments due today, tomorrow, later in the week, or next week. This grouping by relative dates may be particularly effective with students who don't have trouble visualizing calendar dates.

Each display item can also include the number of points the student will receive for handing in the assignment and the estimated time needed to complete the assignment. Categorizing the due dates as indicated above would help the student manage his or her time better, since it would present due dates not as a calendar date, but in straightforward form like "tomorrow."

The display might also remind the student of assignments whose due date was missed, prodding him to complete his other assignments on time by indicating how many points he missed in recent days. It might also present this in terms of game-playing time that would have been available had he gotten the points.

Finally, the display could indicate those things that the student needs to do today, such as bringing something to school. The display of these items in the database could be suppressed until the day that they should be brought (or the evening before), so that the display is not cluttered with items that can't be acted upon early.

Banking Points

Returning to FIG. 1, in Step 103 the user receives banked points that are stored in time management device 201 as a result of the validation of Step 102. The next time the student's time management device connects with the teacher's validation program, the information entered by the teacher will be transmitted to the time management device. If student has accurately entered a task description, a "reward" in the form of banked points will be given the student. If a task entry needed to be adjusted by the teacher response, fewer or no points will be awarded, depending on the nature of the problem with the student's entry of the task description.

Final confirmation that homework has been turned would preferably occur when teachers enter grades in their electronic grade-book or other grading system used by the school. At that point in time, it becomes possible to determine not only that the homework appears to have been turned in, but that it actually was done in a satisfactory way. Points for handing in assignment can be banked and additional points can be given for student achievement on assignments at the time of the next connection of the student's time management device with the teacher's validation program.

Completed assignments with higher grades will receive higher points. It can also award a random number of points for high grades. For instance if the student gets a 90% or above on assignment he or she would normally get 15 points. However, at random times the student might also get an unexpected visual prompt and "jackpot" of 30 additional points. Thus, getting higher grades would be encouraged not only through receiving more points, but through intermittent reinforcement by the potential for a "big reward."

Using Banked Points

Returning to FIG. 1, in Step 104 the user is able to use the points banked on time management device 201 for some socially desirable reward, such as being able to make or receive telephone calls if the time management device is a cell phone, playing music or watching a video if the time management device has a media player function, or playing a game if the time management device acts as a game console.

After school hours the time management device might be used as a phone, gaming device, or video or music player, depending on its capabilities. The amount of time that the student is able to access these features will be directly impacted by the banked points previously awarded for validated entry or completion of assignments, as previously discussed.

Figure 3:
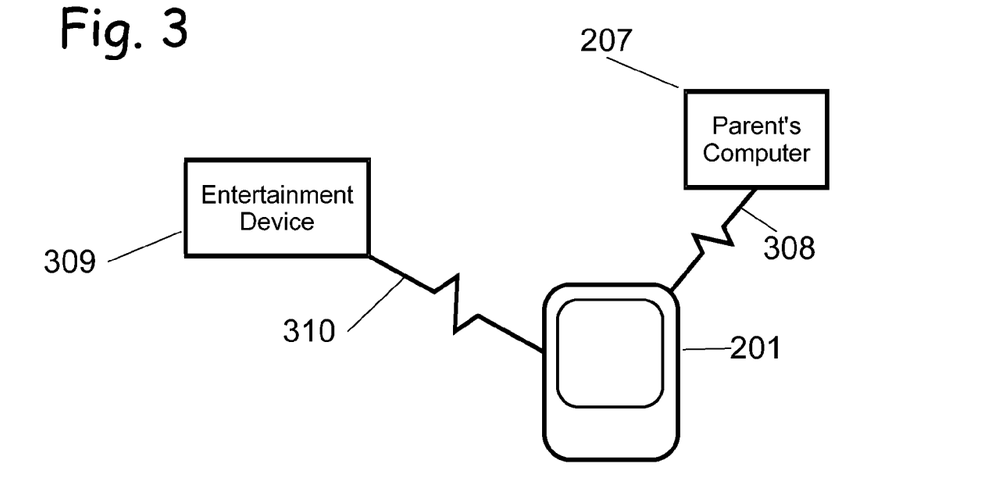
FIG. 3 illustrates another configuration for the system of that application.

Time management device 201 could also act as an activation server for other entertainment devices 309, such as game consoles or even television sets with the appropriate access controls installed, communicating over link 310. As with allowing the student to use accumulated points to play games or listen to music on the time management device, points could also be converted to usage time on other devices.

Parental Involvement

As an addition feature, assignment tracking and grading information from the teachers' computers 203 connected to Internet 205 by link 204 will be accessible to parent/guardian computer 207 connected to Internet 205 by link 206, all conventional technology. This will preferably be through a web site available to the parent and the teacher. Teachers will also have web-based tools for directly communicating with parents regarding permission slips, announcements, and other special information. The web-based teacher site will be available to whichever students/parents the teacher assigns access.

Parents who participate in the web-based program will be able to access both daily assignments and their student's grades through the web site. Thus, if student "forgets" his/her time management device, assignment information will still be accessible at home.

Parents/guardians and the student can also enter other tasks on the student's time management device, either directly or through the web-based system. Direct entry is illustrated in FIG. 3, with parent/guardian computer 207 communicating with time management device 201 over communications link 308.

For instance, practice schedules, doctor's appointments, meetings, or chores could be entered. As those tasks and appointments were checked off as completed, visual and numerical rewards would be given that could be validated and banked by parent entry on parent computer, much the same as for homework assignments.

Automating Task Entry Scoring

The method and system of parent application Ser. No. 12/129,003 requires that the teacher, parent, or other person manually validate, or score, each task entry and award points based on its accuracy. For a class with many students and homework assignments, this could result in a high workload for the teacher at the end of the class day, when all the students are supplying their task entries for scoring before they leave school.

Automating at least some of the teacher responses described above would be highly desirable. This is practical because the time management system described above is directed toward the entering and checking of assignments, not the actual work performed for the assignment.

For example, the assignment may be to perform homework problems 1, 2, 3, 5, and 8 at the end of chapter 9 in the textbook. Points would be given for entering this assignment correctly. Points also might be given when the assignment has been handed in, as part of indicating that the assignment is no longer past due. Finally, points might also be given based on the grade received for the work done on the assignment.

It is important to understand that other embodiments of the system or method that provide additional capabilities or specific implementations are described below, and other extensions are possible without departing from the spirit and scope of our techniques.

DETAILED DESCRIPTION

Figure 4:
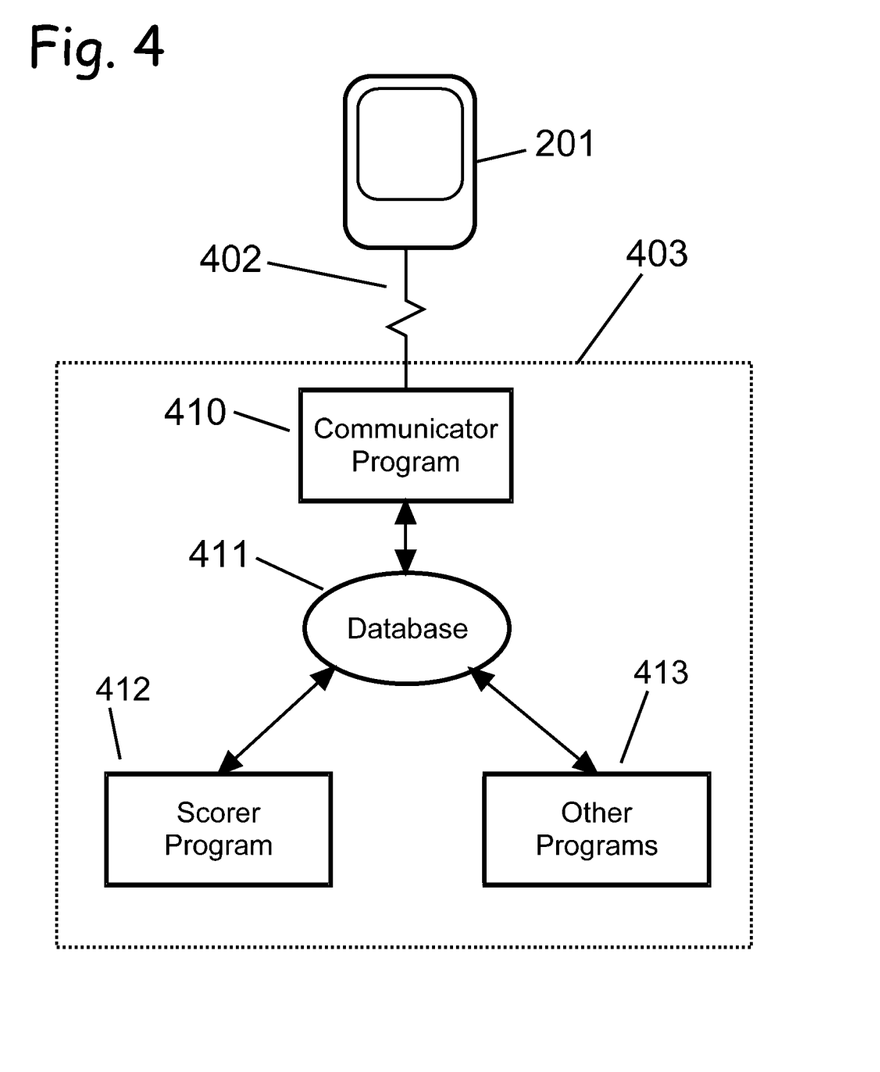
FIG. 4 illustrates a representative configuration for one aspect of the system of this application.

Referring to FIG. 4, one embodiment of the system has two databases: one on a student's time management device 201 and one on a server system 403 that can communicate with time management device 201 over data link 402. Server system 403 includes database 411, which can be accessed by communicator program 410, scorer program 412, and a variety of other programs 413. Database 411 provides the informational link between these programs.

These other programs 413 include programs that allow a teacher to enter information into database 411 about assignments for later use by communicator program 410 and scorer program 412, review and award points for assignments that are not handled automatically by scorer program 412, and monitor student progress and performance. These other programs 413 may also include programs that allow parents to access information about their child's progress and performance.

The Databases

Database 411 is implemented as a relational database, as is the database on time management device 201. The use of relational databases is well-known in the art, and a number of different relational database systems exist that can be used to aid in the implementation.

The database on time management device 201 contains a table with the following items:

Index, a unique identifier for each entry in the table.
CreatedTime, the date and time that the entry was originally created.
ModifiedTime, the date and time that the entry was last modified.
ClassID, the unique identifier for the class or other activity for the task described by this entry.
TypeID, the unique identifier for the type or nature of the task described by this entry. Examples of task types include homework assignments, reading assignments, assignments to bring something to class, or events or appointments to be attended.
Description, a character string describing the particular task.
DueDate, the date and possibly time that an assignment is due or an event is to occur.
TimeEstimate, the time estimated by the teacher needed to complete the task.
CheckedOff, a field that indicates that the student has checked-off the task as completed.
Correct, a character string in the same format as Description that indicates the correct description. It is set by the scorer program or the teacher after review of Description.
EntryPoints, the points awarded for the entry of the task.
TurnInPoints, the points awarded for completing the task, such as turning in a homework assignment.
PossibleGradePoints, the maximum number of points a student can received on the graded assignment.
GradePoints, the number of points actually awarded the student for the graded assignment being completed.

Database 211 contains a similar table, with at least one additional item:

StudentID, the unique identifier for the particular student.
Other database tables would include those that provide additional information about a particular class designated by ClassID, such as the name of the class, who its teacher is, what the subject is, and when it meets, or a particular student designated by StudentID, such as the name of the student, the names or other identifiers for the student's parents or guardians. The student information table also contains an entry indicating when the student's time management device 201 last connected to communicator program 410 as well as any password or authentication information used to assure than only the student's time management device 201 can access the student's information in database 411 when connected to communicator program 410.

Synchronizing the Two Databases

A key aspect of this technique is the synchronization of the database in a student's time management device 201 with database 411. This not only provides a backup of the information in the database in time management device 201, but allows additional and important information to be added to entries in that database. This synchronization is performed by time management device 201 communicating over data link 402 with communicator program 410, which in turn accesses the information in database 411.

Figure 5:
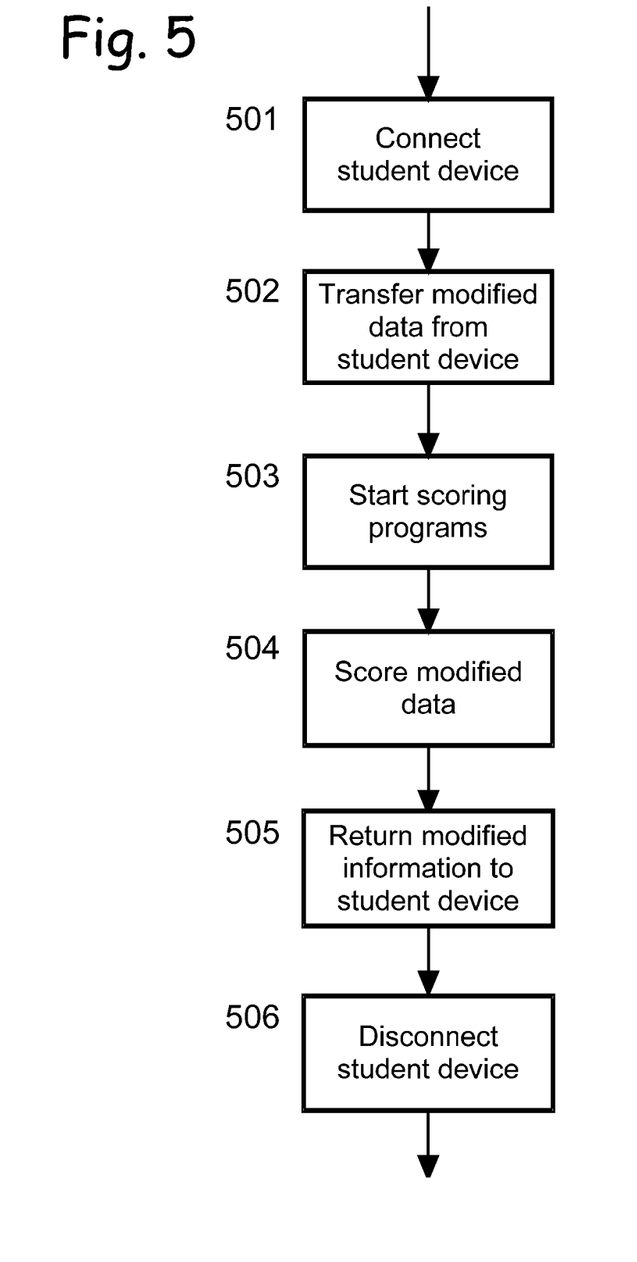
FIG. 5 illustrates the key steps of one aspect of the method of this application.

Referring to FIG. 5, the synchronization begins in Step 501 with a time management device 201 connecting to communicator program 410. This can be in response to time management device being in range of a suitable communications link or some other action. In some embodiments, it is in response to the student selecting a synchronization screen and indicating that the synchronization should start. Using a special screen for this shows the student that the synchronization has been successfully performed and can provide a summary of the results of the synchronization, such as indicating points being added to the bank and why, or which assignments were entered incorrectly and have been corrected. It also assures that the student cannot change the database in his time management device 201 during the time of synchronization because he cannot access a display that allows changing the database.

Communicator program 410 starts the communications by sending a banner that includes the version number of the protocol it speaks. Time management device 201 responds with the version of the protocol it will speak (which must be lesser than or equal to the version indicated by communicator program 410), the StudentID for the student using the particular time management device 201, and any other information needed to authenticate the student.

If the StudentID is valid and the student has been authenticated, communicator program 410 responds with the time the particular time management device 201 last communicated with communicator program 410.

In Step 502, time management device 201 uses the last communications time to retrieve all task entries that have been modified since that time from the database in time management device 201. It then transfers each of those task entries to communicator program 410, which in turn writes them in database 411. Communicator program 410 can use the StudentID concatenated with the Index received for an entry to determine if the entry doesn't already exist in database 411, in which case it creates an entry containing the received information.

If the task entry already exists in database 411, it can be updated by communicator program 410 with the information received. Alternatively, a check can be made of the ModifiedTime field for the entry in database 411, and if it is after the time of the last communications with the particular time management device 201, that indicates that it has been changed by both the student on time management device 201 and some program running on server system 403 and accessing database 411. If this happens, it means that an error should be given indicating that the task entry had been modified by both the student and somebody else. At that point, either the student modification can be made to database 411 (causing the modification by the program running on server system 203 to be lost), the student modification can be discarded (and the student notified), or the student modification can be merged with the modified entry in database 411 if possible.

After an entry in database 411 have been modified by communicator program 410, communicator program 410 starts a scorer programs 412 appropriate for the ClassID of the of the entry in Step 503.

Communicator program 410 waits until it has modified all the entries with a particular ClassID in database 411, then looks up the name of the program to start for that particular ClassID in a table in database 411. It starts scorer program 412 using the appropriate operating system function (fork/exec, in the case of a Unix-type operating system), passing that program the StudentID, the ClassID, and the time of the last communications with the particular time management device 201. Having the ClassID used as a parameter for scorer program 412 allows the same scorer program to be used for a number of similar classes.

In Step 504, scorer program 412 retrieves any entries in database 411 that have been modified since the time of the last communications with the particular time management device 201 (and therefore modified in database 411 in Step 502) for the particular StudentID and ClassID. It examines the Description field, determines whether it is correct and how many points to give, places that value in EntryPoints, puts the correct description in Correct and modifies the TypeID and DueDate fields if they are incorrect, and fills in the TimeEstimate, TurnInPoints, and PossibleGradePoints fields. It also sets the GradePoints field to zero. It sets ModifiedTime to the time it made these modifications.

When all modified entries for a particular ClassID and StudentID in database 411 that can be handled by scorer program 412 have been processed, scorer program indicates that it has completed its work to communicator program 410. When all scorer programs 412 that were started by communicator program 410 have completed, communications resumes with time management device 201. (It might have been necessary for communicator program 410 to send "keep-alive" or progress messages to time management device 201 to assure data link 402 remains up.)

In Step 505, communications program 410 retrieves any entry for the particular StudentID that has been modified since the time of the last communications with the particular time management device 201. This will include all the entries that were modified in Step 504 by scorer program 412, including an indication of the points awarded by scorer program 412.

It will also include all entries added or modified in database 411 by some other program 413 that are not already in the database of the particular time management device 201. This includes task entries that were entered by the teacher instead of the student on his time management device 201 This is particularly useful as the student is becoming familiar with time management device 201, since the teacher can enter the task entries until the student is more familiar with using the system.

Communicator program 410 then returns these modified task entries to time management device 201, which in turn stores them in its database. After all modified entries have been returned, in Step 506 communicator program 410 disconnects from time management device 201. Communicator program also stores the time the communications ended in database 411, to be used as the last communications time for the next connection from the particular time management device 201.

Scoring

The task of Step 504, scoring the modified data that was received by communicator program 410 from some time management device 201 is conceptually simple: for each modified entry in database 410 for the particular ClassID and StudentID, determine how it differs from an assignment given by the class's teacher and determine how many points to award based on that difference.

The correct assignment information can be entered by the teacher into database 411 through one of the other programs 413, or otherwise provided scoring program 412. One possible way for this to be entered is for one of the other programs 413 to connect to the existing grade-book program used in the school and retrieve the information. Similarly, it can retrieve information about whether an assignment has been turned in and its grade, in order to fill in the GradePoints field for the assignment in database 411.

It is important to remember that we are talking about scoring the entry of the assignment ("do homework problems 1, 2, 3, 5, and 8 at the end of chapter 9 in the textbook") and not scoring the work done in completing the assignment. While taking the free-form text describing a homework assignment and matching to a known assignment can be complicated, there are a number of things that can be done to make this task easier.

First, rather than be free-form text entered by the student, the assignment can be put in a canonical form. For example, instead of "problems 2, 1, 5, 3, and 8 at the end of chapter 9" (or some other arrangement of the problems), the assignment can be stored as "9:1,2,3,5,8" or something similar. This canonical form can be displayed by time management device 201 in a less cryptic form, for the benefit of the student.

Putting the assignment in a canonical form can be done in a number of ways. For example, the displayed page for entering an assignment can use selection wheels or other graphical techniques to drive what can be entered, and then the values specified through those techniques can be stored in the canonical form. This is similar to the technique of bringing up month/day/time wheels used to specify the time and date of an event in a calendar program, which the selection then being transformed into the system-standard date/time representation.

Time management device 201 can also have knowledge of possible assignments, such as a listing of all the problems for each chapter in a textbook. A wheel, pull-down menu, or other technique can be used by the student to select the chapter (the textbook being known for the particular class selected by the student), and a checklist of all the problems presented. The student can then select the assigned problems.

These more guided techniques are particularly useful for young students learning how to use time management device 201. As students become more familiar with its use and mature, the reward system may become less important, and thereby reduce the need for automatically scoring the assignments soon after they have been entered.

Descriptions of homework assignments can also be converted to the canonical form by either the program running on time management device 201 or by communicator program 410. Communicator program 410 is particularly suitable for this activity, since it most likely is running on a more powerful processor and its program can be continually enhanced for better recognition of students' free-form input without affecting the programs on numerous time management devices 201.

Manual Intervention

Finally, it needs to be recognized that as the technique is implemented, it is not necessary to automatically score every assignment when it is received from a student's time management device 201. If an entry cannot be scored automatically, scorer program 412 does not modify the entry in database 411, and in particular does not place an entry in the Correct field nor change the ModifiedTime from that received by communicator program 410 from time management device 201. If step 505 is modified to return only items from database 411 that both have been modified since the time of the last communications with the particular time management device 201 and have an entry in the Correct field, items that have not been scored will not be returned to the student's time management device 201 in Step 505.

At some later time, one of other programs 413, being used by the teacher, can retrieve items in database 411 which do not have an entry in the Correct field, and the teacher can manually score those assignments. The teacher can also recognize if any assignments were not entered by the student, and add those to database 411 for the particular student and class. The next time that the student connects his time management device 201 to communicator program 410, these manually-corrected or missed assignments will be transferred to his time management device as part of step 505.

Additional Communication

Besides database synchronization messages, other communications can take place over data link 402 between time management device 201 and communicator program 210. For example, updates to the programs running on time management device 201 can be downloaded, similar to the way software on personal computers is updated online. Similarly, games, music, videos, or other rewards can be downloaded to be later available for use if the student has banked sufficient points.

Of more pertinence, class information, such as templates of textbook homework problems can be downloaded for to aid in generating displays on time management device 201 allowing the student to select the problems of a particular assignment.

Finally, logging information can be uploaded from time management device 201 to communicator program 210 for storage in database 211 or some other media, indicating how a student is using time management device 201. The system can have the capability to track student assignment entry accuracy, teacher activity, and time of use. This information can be used by user interface designers to improve the programs running on time management device 201, or by a teacher to determine if the student is using time management device 201 effectively.

Other Embodiments

Other digital computer system configurations can also be employed to perform the method of our techniques, and to the extent that a particular system configuration is capable of performing the method of our techniques, it is equivalent to the digital computer system described here, and within the scope and spirit of our techniques.

Once they are programmed to perform particular functions pursuant to instructions from program software that implements the method of our techniques, such digital computer systems in effect become special-purpose computers particular to the method of our techniques. The techniques necessary for this are well-known to those skilled in the art of computer systems.

Computer programs for creating the special-purpose computer supporting the method of our techniques will commonly be distributed to users on a non-transitory distribution medium such as floppy disk or CD-ROM. From there, they will often be copied to a hard disk, flash memory, or a similar intermediate storage medium. When the programs are to be run, they will be loaded either from their distribution medium or their intermediate storage medium into the execution memory of the computer, configuring the computer to support the method of our techniques. All these operations are well-known to those skilled in the art of computer systems.

The term "non-transitory computer-readable medium" encompasses non-transitory distribution media, intermediate storage media, execution memory of a computer, and any other non-transitory medium or device capable of storing for later reading by a computer a computer program implementing the method of our techniques.

It is to be understood that the above described embodiments are merely illustrative of numerous and varied other embodiments which may constitute applications of the principles of our techniques. Such other embodiments may be readily devised by those skilled in the art without departing from the spirit or scope of our techniques and it is our intent they be deemed within the scope of our invention.

We claim:

1. A method for validating, without human intervention, a task entry previously entered by a user on an electronic time management device, comprising:
   connecting, by a server system, with the electronic time management device over a communications network;
   receiving, at the server system, the task entry from the electronic time management device, the task entry including a description of a task to be performed and a required completion time;
   determining a plurality of updated task entries from the user that are new since a last connection with the electronic time management device, wherein the plurality of updated task entries include the task entry;
   in response to determining the plurality of updated task entries that are new, scoring, by the server system, the task entry based on a correct version of the task entry;
   awarding points based on the scoring of the task entry; and
   returning an indication of the points awarded to the electronic time management device.

2. The method of claim 1, where the task to be performed is a school homework assignment.

3. The method of claim 2, where the correct version of the task entry is from an existing grade-book program.

4. The method of claim 1, further comprising returning the correct task entry to the electronic time management device if the task entry entered by the user was incorrect.

5. The method of claim 1, further comprising returning an indication of additional points to the electronic time management device as a result of the task being successfully completed.

6. An automated scoring device having a processor that executes a program contained in a memory, the program implementing a method, the method comprising:
   connecting the scoring device with an electronic time management device over a communications network;
   receiving, at the scoring device, the task entry from the electronic time management device, the task entry including a description of a task to be performed and a required completion time;
   updating a database with the task entry;
   determining one or more updated task entries to be scored, wherein the one or more updated task entries include the task entry;
   scoring, by the scoring device, the task entry based on a correct version of the task entry;
   awarding, by the scoring device, points based on the scoring of the task entry; and
   returning an indication of the points awarded to the electronic time management device.

7. The device of claim 6, where the task to be performed is a school homework assignment.

8. The device of claim 7, where the correct version of the task entry is from an existing grade-book program, wherein the task entry includes a first class identifier and another task entry received during the connection includes a second class identifier, and wherein the device locates the correct version of the task entry based on the first class identifier.

9. The device of claim 6, wherein the electronic time management device is configured to prompt a user to input the task entry if the task entry has not been received.

10. The device of claim 6, where the method further comprises returning an indication of additional points to the electronic time management device as a result of the task being successfully completed, and wherein the additional points include points determined from a grade on the task.

11. A non-transitory computer-readable medium storing a computer program implementing a method, the method comprising:
    connecting a server system with an electronic time management device over a communications network;
    receiving at the server system the task entry from the electronic time management device, the task entry including a description of a task to be performed and a required completion time, wherein the electronic time management device transmits the task entry in response to determining the task entry is new since a last connection;
    scoring by the server system the task entry based on a correct version of the task entry;
    awarding by the server system points based on the scoring of the task entry; and
    returning an indication of the points awarded to the electronic time management device.

12. The medium of claim 11, where the task to be performed is a school homework assignment.

13. The method of claim 12, where the correct version of the task entry is from an existing grade-book program.

14. The medium of claim 11, where the method further comprises returning the correct task entry to the electronic time management device if the task entry entered by the user was incorrect.

15. The medium of claim 11, where the method further comprises returning an indication of additional points to the electronic time management device as a result of the task being successfully completed.

16. A method for validating a task entry previously entered by a user on an electronic time management device, comprising:
    connecting, by a communicator component of a server system, with the electronic time management device over a communications network;
    receiving, at a scorer component of the server system, the task entry from the electronic time management device, the task entry including a description of a task to be performed and a required completion time, wherein the electronic time management device determines the task entry is new since a last connection;
    determining, by the scorer component, whether the task entry can be automatically scored;
    if the task entry can be automatically scored, then:
        scoring, by the scorer component, the task entry based on a correct version of the task entry; and awarding, by the scorer component, points based on the scoring of the task entry;

otherwise:
  providing the task entry to a person for scoring; and
  receiving the points that the person has awarded; and
then returning an indication of the points awarded to the electronic time management device.

17. An automated scoring device having a processor that executes a program contained in a memory, the program implementing the method of claim 16.

18. A non-transitory computer-readable medium storing a computer program implementing the method of claim 16.

19. The method of claim 16, where the task to be performed is a school homework assignment.

20. The method of claim 19, where the correct version of the task entry is from an existing grade-book program.

21. The method of claim 19, where the person doing the scoring is a teacher who made the school homework assignment.

22. The method of claim 16, further comprising returning the correct task entry to the electronic time management device if the task entry entered by the user was incorrect.

23. The method of claim 16, further comprising returning an indication of additional points to the electronic time management device as a result of the task being successfully completed.

* * * * *